United States Patent
Cai

(10) Patent No.: US 11,252,721 B2
(45) Date of Patent: Feb. 15, 2022

(54) SLOT FORMAT INDICATION TO A UE GROUP IN A CELL OF A BASE STATION

(71) Applicant: NOKIA TECHNOLOGIES OY, Espoo (FI)

(72) Inventor: Yigang Cai, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 84 days.

(21) Appl. No.: 16/760,573

(22) PCT Filed: Nov. 2, 2017

(86) PCT No.: PCT/US2017/059751
§ 371 (c)(1),
(2) Date: Apr. 30, 2020

(87) PCT Pub. No.: WO2019/089033
PCT Pub. Date: May 9, 2019

(65) Prior Publication Data
US 2020/0351872 A1    Nov. 5, 2020

Related U.S. Application Data

(63) Continuation of application No. PCT/US2017/059751, filed on Nov. 2, 2017.

(51) Int. Cl.
*H04W 72/04* (2009.01)
*H04W 4/08* (2009.01)

(52) U.S. Cl.
CPC ......... *H04W 72/0446* (2013.01); *H04W 4/08* (2013.01); *H04W 72/042* (2013.01)

(58) Field of Classification Search
CPC ....... H04W 76/40; H04W 8/06; H04W 8/186; H04W 48/18; H04W 29/08; H04W 4/08
See application file for complete search history.

(56) References Cited

U.S. PATENT DOCUMENTS

2017/0025786 A1    1/2017 Hagmann et al.
2017/0332359 A1*  11/2017 Tsai .................. H04W 72/0446
(Continued)

FOREIGN PATENT DOCUMENTS

WO    WO 2017/155273 A1    9/2017
WO    WO-2018145019 A1 *   8/2018    .......... H04W 72/042

OTHER PUBLICATIONS

International Search Report and Written Opinion dated Jul. 9, 2018 corresponding to International Patent Application No. PCT/US2017/059751.

(Continued)

*Primary Examiner* — Ayaz R Sheikh
*Assistant Examiner* — Tarell A Hampton
(74) *Attorney, Agent, or Firm* — Squire Patton Boggs (US) LLP

(57) ABSTRACT

Systems and methods for allocating resources of an air interface. In one embodiment, a base station communicates with a plurality of User Equipment (UE) within a cell over an air interface. The base station selects a UE group from the UEs in the cell to share a physical downlink control channel, selects a slot format for the UE group, and identifies a slot format indicator for the UE group. The base station generates a group ID for the UE group so that a combination of the group ID and the slot format indicator indicates a slot format value that is mapped to the selected slot format for the UE group, provides the group ID to the UE group, and transmits the slot format indicator on the physical downlink control channel to the UE group.

17 Claims, 14 Drawing Sheets

(56) References Cited

U.S. PATENT DOCUMENTS

| | | | |
|---|---|---|---|
| 2018/0234955 A1* | 8/2018 | Lin | H04L 5/0094 |
| 2018/0279304 A1* | 9/2018 | Lee | H04W 72/0446 |
| 2018/0309513 A1* | 10/2018 | Kim | H04B 7/2643 |
| 2018/0368115 A1* | 12/2018 | Li | H04L 5/0037 |
| 2019/0245648 A1* | 8/2019 | Jo | H04L 5/0098 |
| 2019/0380125 A1* | 12/2019 | Yamamoto | H04L 5/0055 |
| 2020/0236732 A1* | 7/2020 | Liu | H04L 27/2602 |
| 2020/0260417 A1* | 8/2020 | Jo | H04W 72/042 |
| 2020/0275417 A1* | 8/2020 | Takeda | H04L 5/0007 |
| 2021/0143963 A1* | 5/2021 | Matsuda | H04L 5/0037 |

OTHER PUBLICATIONS

Xiaomi, "Discussion on the remaining issues of group common PDCCH," 3GPP Draft, R1-1718461, 3GPP TSG RAN WG1 Meeting 90bis, Prague, CZ, Oct. 8, 2017, XP051341643.
NTT Docomo et al: "Remaining issues on structure of group-common PDCCH," 3GPP Draft; R1-1713934, 3GPP TSG RAN WG1 Meeting #90, Prague, Czechia, Aug. 20, 2017, XP051316726.
Wilus Inc: "Discussion on UE behavior for group-common PDCCH for NR," 3GPP Draft; R1-1716631, 3GPP TSG RAN WG1, Meeting NR#3, Nagoya, Japan, Sep. 17, 2017, XP051340081.
First Examination Report dated Nov. 10, 2021 corresponding to Indian Patent Application No. 202047018733.

* cited by examiner

| SLOT FORMAT CATEGORY 801 | |
|---|---|
| SFI 811 | SLOT FORMAT 831 \| SYMBOL PATTERN 861 |
| | SLOT FORMAT 832 \| SYMBOL PATTERN 862 |
| | SLOT FORMAT 833 \| SYMBOL PATTERN 863 |
| | SLOT FORMAT 834 \| SYMBOL PATTERN 864 |
| | ... |

| SLOT FORMAT CATEGORY 802 | |
|---|---|
| SFI 812 | SLOT FORMAT 835 \| SYMBOL PATTERN 865 |
| | SLOT FORMAT 836 \| SYMBOL PATTERN 866 |
| | SLOT FORMAT 837 \| SYMBOL PATTERN 867 |
| | SLOT FORMAT 838 \| SYMBOL PATTERN 868 |
| | ... |

| SLOT FORMAT CATEGORY 803 | |
|---|---|
| SFI 813 | SLOT FORMAT 839 \| SYMBOL PATTERN 869 |
| | SLOT FORMAT 840 \| SYMBOL PATTERN 870 |
| | SLOT FORMAT 841 \| SYMBOL PATTERN 871 |
| | SLOT FORMAT 842 \| SYMBOL PATTERN 872 |
| | ... |

| SLOT FORMAT CATEGORY 804 | |
|---|---|
| SFI 814 | SLOT FORMAT 843 \| SYMBOL PATTERN 873 |
| | SLOT FORMAT 844 \| SYMBOL PATTERN 874 |
| | SLOT FORMAT 845 \| SYMBOL PATTERN 875 |
| | SLOT FORMAT 846 \| SYMBOL PATTERN 876 |
| | ... |

| SLOT FORMAT CATEGORY 805 | |
|---|---|
| SFI 815 | SLOT FORMAT 847 \| SYMBOL PATTERN 877 |
| | SLOT FORMAT 848 \| SYMBOL PATTERN 878 |
| | SLOT FORMAT 849 \| SYMBOL PATTERN 879 |
| | SLOT FORMAT 850 \| SYMBOL PATTERN 880 |
| | ... |

| 861 → | SLOT0 | | | | | | | SLOT1 | | | | | | |
|---|---|---|---|---|---|---|---|---|---|---|---|---|---|---|
| | 0 | 1 | 2 | 3 | 4 | 5 | 6 | 0 | 1 | 2 | 3 | 4 | 5 | 6 |
| | ▓ | DL | DL | DL | DL | DL | DL | DL | DL | DL | DL | DL | DL | DL |

GC-PDCCH

FIG. 10

| 865 → | SLOT0 | | | | | | | SLOT1 | | | | | | |
|---|---|---|---|---|---|---|---|---|---|---|---|---|---|---|
| | 0 | 1 | 2 | 3 | 4 | 5 | 6 | 0 | 1 | 2 | 3 | 4 | 5 | 6 |
| | ▓ | DL | DL | DL | DL | DL | DL | DL | DL | DL | DL | DL | UL | UL |

GC-PDCCH

FIG. 11

| 869 → | SLOT0 | | | | | | | SLOT1 | | | | | | |
|---|---|---|---|---|---|---|---|---|---|---|---|---|---|---|
| | 0 | 1 | 2 | 3 | 4 | 5 | 6 | 0 | 1 | 2 | 3 | 4 | 5 | 6 |
| | ▓ | UL | UL | UL | UL | UL | UL | UL | UL | UL | UL | UL | UL | UL |

GC-PDCCH

FIG. 12

| 873 → | SLOT0 | | | | | | | SLOT1 | | | | | | |
|---|---|---|---|---|---|---|---|---|---|---|---|---|---|---|
| | 0 | 1 | 2 | 3 | 4 | 5 | 6 | 0 | 1 | 2 | 3 | 4 | 5 | 6 |
| | ▓ | DL | DL | UL | UL | UL | UL | UL | UL | UL | UL | UL | UL | UL |

GC-PDCCH

FIG. 13

| 877 → | SLOT0 | | | | | | | SLOT1 | | | | | | |
|---|---|---|---|---|---|---|---|---|---|---|---|---|---|---|
| | 0 | 1 | 2 | 3 | 4 | 5 | 6 | 0 | 1 | 2 | 3 | 4 | 5 | 6 |
| | ▓ | DL | DL | DL | DL | DL | DL | UL | UL | UL | UL | UL | UL | UL |

GC-PDCCH

SLOT FORMAT INDICATION TO A UE GROUP IN A CELL OF A BASE STATION

FIELD OF THE INVENTION

The invention is related to the field of communication systems and, in particular, to resource allocation on the air interface between UEs and a base station.

BACKGROUND

The air interface of a mobile network is the radio-based communication link between a mobile device (e.g., User Equipment (UE)) and a base station. As data traffic on mobile networks increases, there is a need to effectively use the radio resources on the air interface. At the physical layer, the radio resources are distributed to different entities (i.e., UEs). The smallest unit allocated to an entity is a Resource Block (RB) or Physical Resource Block (PRB) that is made up of one slot in the time domain and multiple sub-carriers in the frequency domain. In the time domain, the slot is comprised of a set of symbols (e.g., seven symbols), and each symbol may be assigned to a control channel, a data channel, a reference signal, etc.

A Physical Downlink Control Channel (PDCCH) is used on the air interface to provide scheduling assignments and other control information to UEs. A UE is required to perform blind decoding of the PDCCH to determine the number of control channels and the number of Control Channel Elements (CCEs) for each control channel. The UE monitors a set of PDCCH candidates (a set of consecutive CCEs on which a PDCCH could be mapped) in each sub-frame (i.e., two slots), and uses its Radio Network Temporary Identifier (RNTI) to attempt to decode the PDCCH candidates. If the UE successfully decodes a PDCCH candidate, then the UE retrieves the control information from the PDCCH candidate, such as Downlink Control Information (DCI).

In next-generation networks, a group common PDCCH may be defined to reduce unnecessary blind decoding attempts. A base station may use the group common PDCCH to send control information to a group of UEs. When a UE in the UE group decodes the group common PDCCH, it may skip blind decoding of PDCCH candidates in that slot. Using this approach, UEs can avoid making unnecessary blind decoding attempts of the PDCCH for each sub-frame, and save battery power.

Although a general concept of a group common PDCCH has been described for next-generation networks, problems still remain as to how the group common PDCCH is implemented.

SUMMARY

Embodiments described herein use a physical downlink control channel for a UE group (e.g., a group common PDCCH) to provide control information to the UEs in the UE group. As many UEs may be present in a cell of a base station, the embodiments described herein set forth a way of selecting one or more UE groups that are able to decode a physical downlink control channel for a UE group. Further embodiments provide a way for a base station to indicate a slot format for the UEs in the UE group over the physical downlink control channel for the UE group. The base station is able to provide a slot format indicator in the physical downlink control channel for the UE group. The base station also generates a group ID for the UE group so that a combination of the group ID and the slot format indicator points to a particular slot format for UEs in the UE group. Thus, the UEs in the UE group are able to decipher a particular slot format based on the slot format indicator and the group ID provided by the base station. This advantageously allows a network operator to define many different slot formats to effectively utilize the radio resources of the air interface, and allows base stations to indicate a selected slot format for an entire UE group over a group common PDCCH.

One embodiment comprises a base station comprising a radio interface component configured to communicate with a plurality of UEs within a cell over an air interface. The base station comprises a database configured to store information for a plurality of slot formats that define allocation of radio resources on the air interface, where the slot formats are classified into slot format categories. The base station comprises a selection engine configured to identify the UEs in the cell, to process selection criteria to select a UE group from the UEs in the cell to share a physical downlink control channel (e.g., a group common PDCCH) assigned to the UE group, to process the selection criteria to select one of the slot formats for the UE group, and to identify a slot format indicator for the UE group that is mapped to one of the slot format categories for the one of the slot formats. The base station comprises a group ID generator configured to generate a group ID for the UE group so that a combination of the group ID and the slot format indicator indicates a slot format value that is mapped to the one of the slot formats selected for the UE group, and to provide the group ID to the UEs in the UE group via the radio interface component. The base station comprises a scheduler configured to transmit the slot format indicator on the physical downlink control channel to the UEs in the UE group via the radio interface component.

In another embodiment, the group ID generator is configured to transmit the group ID to the UEs in the UE group through Radio Resource Control (RRC) signaling.

In another embodiment, the group ID generator is configured to define a validity timer for the group ID.

In another embodiment, the slot formats each define a symbol pattern that maps symbols for at least one slot of a frame in the time domain to a transmission direction. The transmission direction includes downlink, uplink, blank, sidelink, and reserved.

In another embodiment, the selection criteria include services requested by the UEs in the cell. The services comprise one of enhanced Mobile Broadband (eMBB), massive Machine Type Communications (mMTC), and Ultra-Reliable and Low Latency Communications (URLLC).

In another embodiment, the selection criteria include UE categories for the UEs in the cell.

In another embodiment, the selection criteria include radio access technologies for the UEs in the cell.

In another embodiment, the selection criteria include signal strength of the UEs in the cell.

In another embodiment, the selection criteria include battery power levels of the UEs in the cell.

In another embodiment, the selection criteria include tracking areas for the UEs in the cell.

Another embodiment comprises a method of operating a base station that communicates with a plurality of UEs within a cell over an air interface. The method comprising storing information for a plurality of slot formats that define allocation of radio resources on the air interface, where the slot formats are classified into slot format categories. The method comprises identifying the UEs in the cell, processing selection criteria to select a UE group from the UEs in the cell to share a physical downlink control channel assigned to the UE group, processing the selection criteria to select one of the slot formats for the UE group, and identifying a slot format indicator for the UE group that is mapped to one of the slot format categories for the one of the slot formats. The method comprises generating a group ID for the UE group so that a combination of the group ID and the slot format indicator indicates a slot format value that is mapped to the one of the slot formats selected for the UE group, and providing the group ID from the base station to the UEs in the UE group. The method comprises transmitting the slot format indicator on the physical downlink control channel to the UEs in the UE group.

In another embodiment, providing the group ID from the base station to the UEs in the UE group comprises transmitting the group ID to the UEs in the UE group through RRC signaling.

In another embodiment, the method further comprises defining a validity timer for the group ID.

Another embodiment comprises a UE. The UE comprises a radio interface component configured to communicate with a base station over an air interface. The UE comprises a memory configured to store a data structure that maps slot format values to slot formats that define allocation of radio resources on the air interface. The UE comprises a processor that implements a transmission controller configured to receive a group ID from the base station indicating a UE group selected by the base station for the UE, and to decode a slot format indicator from a physical downlink control channel assigned to the UE group. The processor implements a slot format determination mechanism configured to determine a slot format value based on a combination of the group ID and the slot format indicator, and to determine one of the slot formats selected by the base station for the UE group based on the slot format value. The transmission controller is configured to process at least one slot of the radio resources based on the one of the slot formats selected by the base station for the UE group.

In another embodiment, the transmission controller is configured to process RRC signaling to receive the group ID.

In another embodiment, the slot format determination mechanism is configured to concatenate the group ID and the slot format indicator to determine the slot format value.

In another embodiment, the transmission controller is configured to negotiate with the base station whether or not to be included in the UE group.

Another embodiment comprises a method operable in a UE that communicates with a base station over an air interface. The method comprises storing a data structure that maps slot format values to slot formats that define allocation of radio resources on the air interface. The method comprises receiving a group ID from the base station indicating a UE group selected by the base station for the UE, decoding a slot format indicator from a physical downlink control channel assigned to the UE group, determining a slot format value based on a combination of the group ID and the slot format indicator, determining one of the slot formats selected by the base station for the UE group based on the slot format value, and processing at least one slot of the radio resources based on the one of the slot formats selected by the base station for the UE group.

In another embodiment, receiving the group ID from the base station comprises processing RRC signaling to receive the group ID.

Another embodiment comprises a base station comprising a means for communicating with a plurality of UEs within a cell over an air interface. The base station comprises a means for storing information for a plurality of slot formats that define allocation of radio resources on the air interface, where the slot formats are classified into slot format categories. The base station comprises a means for identifying the UEs in the cell. The base station comprises a means for processing selection criteria to select a UE group from the UEs in the cell to share a physical downlink control channel assigned to the UE group. The base station comprises a means for processing the selection criteria to select one of the slot formats for the UE group. The base station comprises a means for identifying a slot format indicator for the UE group that is mapped to one of the slot format categories for the one of the slot formats. The base station comprises a means for generating a group ID for the UE group so that a combination of the group ID and the slot format indicator indicates a slot format value that is mapped to the one of the slot formats selected for the UE group. The base station comprises a means for providing the group ID to the UEs in the UE group via the radio interface component. The base station comprises a means for transmitting the slot format indicator on the physical downlink control channel to the UEs in the UE group via the radio interface component.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIG. 8 illustrates information stored by a database in an illustrative embodiment.

FIGS. 9-13 illustrate symbol patterns in an illustrative embodiment.

DESCRIPTION OF EMBODIMENTS

The figures and the following description illustrate specific illustrative embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
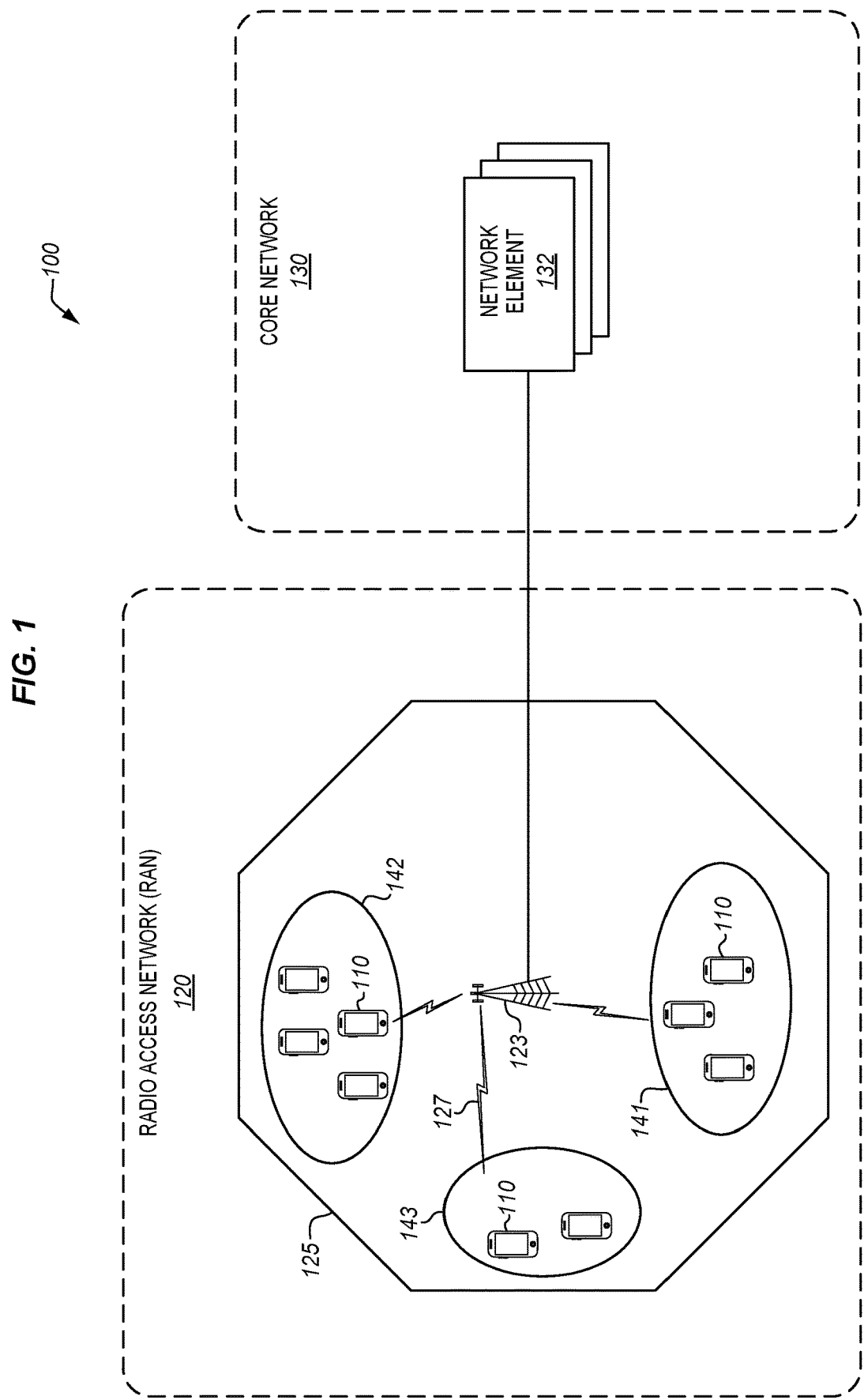
FIG. 1 illustrates a communication network in an illustrative embodiment.

FIG. 1 illustrates a communication network 100 in an illustrative embodiment. Communication network 100 is a cellular network or mobile network where the last link is wireless, and provides voice and/or data services to a plurality of devices. Communication network 100 is a Third Generation (3G) network, a Fourth Generation (4G) network such as a Long Term Evolution (LTE) network, or a next-generation network (e.g., 5G or later). Communication network 100 is illustrated as providing communication services to User Equipment (UE) 110.

Communication network 100 includes a Radio Access Network (RAN) 120 that includes one or more base stations 123. Base station 123 comprises an access network element that uses radio communication technology to communicate with a device on the licensed spectrum and interface the device with a core network. One example of RAN 120 is an Evolved-UMTS Terrestrial Radio Access Network (E-UTRAN) having one or more Evolved-NodeBs (eNodeB), which are base stations of the E-UTRAN. Base station 123 has a service area that is referred to as a cell 125. UEs 110 that are located within cell 125 are able to communicate with base station 123 over the air interface 127, which is the communication link between a UE and a base station. A UE 110 is an end terminal for a communication, and may be used directly by an end user (e.g., a human). Examples of UE 110 include smartphones, laptop computers, tablets, etc. UEs 110 may be enabled for regular voice and/or data services, Machine-Type Communications (MTC), or other types of communications.

UEs 110 are able to attach to RAN 120 to access a core network 130. Core network 130 is the central part of communication network 100 that provides various services to customers who are connected by RAN 120. One example of core network 130 is the Evolved Packet Core (EPC) network as suggested by the 3GPP for LTE, although a core network for next-generation networks is considered herein. Core network 130 includes one or more network elements 132, which comprise a server, device, apparatus, or equipment (including hardware) that provides services for UEs 110. Network elements 132, particularly in an EPC network, may comprise a Mobility Management Entity (MME), a Serving Gateway (S-GW), a Packet Data Network Gateway (P-GW), etc. Within an EPC network, the user data (also referred to as the "user plane") and the signaling (also referred to as the "control plane") are separated. The MME handles the control plane within the EPC network. For instance, the MME handles the signaling related to mobility and security for E-UTRAN access. The MME is responsible for tracking and paging mobile devices in idle-mode. The S-GW and P-GW handle the user plane. The S-GW and P-GW transport IP data traffic between UEs 110 and external IP networks (not shown). The S-GW is the point of interconnect between the radio-side and the EPC network, and serves a UE 110 by routing incoming and outgoing IP packets. The S-GW is also the anchor point for the intra-LTE mobility (i.e., in case of handover between eNodeBs), and between LTE and other 3GPP accesses. The P-GW is the point of interconnect between the EPC network and external IP networks, and routes packets to and from the external IP networks.

Figure 2:
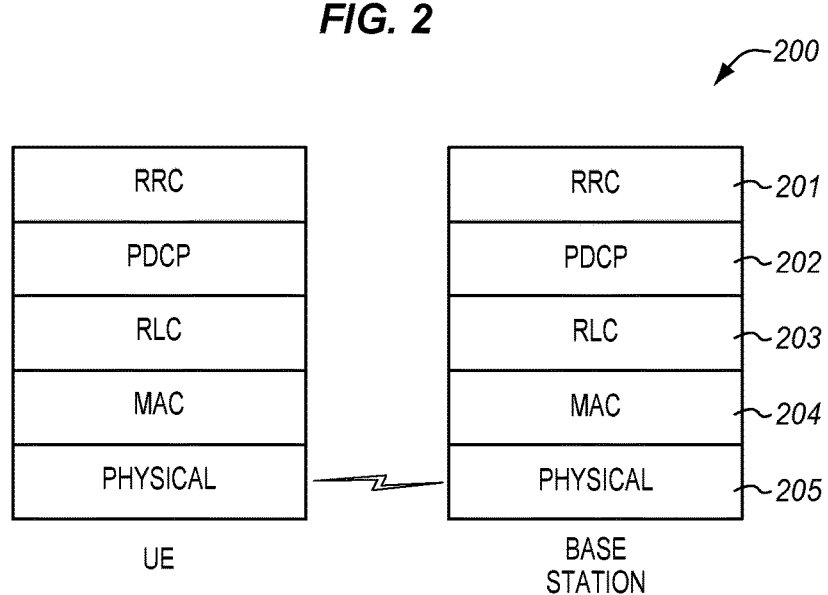
FIG. 2 illustrates the LTE protocol stack for the air interface between a UE and a base station.

FIG. 2 illustrates the LTE protocol stack 200 for the air interface between a UE and a base station. A similar type of protocol stack may be envisioned for next-generation networks. For the user plane and the control plane, LTE protocol stack 200 includes the Radio Resource Control (RRC) layer 201, Packet Data Convergence Protocol (PDCP) layer 202, the Radio Link Control (RLC) layer 203, the Medium Access Control (MAC) layer 204, and the physical layer 205. The main function of RRC layer 201 is to broadcast System Information related to the non-access stratum (NAS), broadcast System Information related to the access stratum (AS), paging, establishment, maintenance and release of RRC connections, etc. Physical layer 205 offers data transport services between a base station and a UE to the higher layers 201-204. Data and signaling messages are carried on physical channels between the different levels of physical layer 205.

Figure 3:
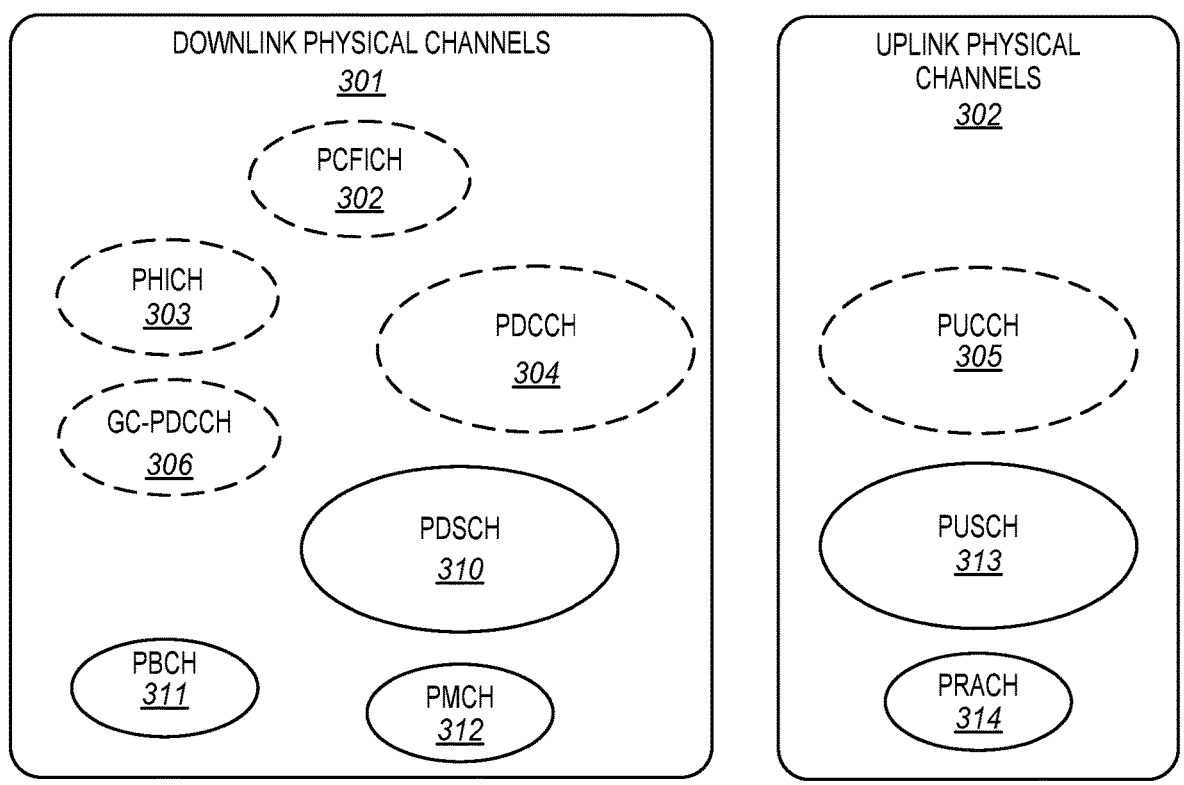
FIG. 3 illustrates physical channels of an air interface in an illustrative embodiment.

FIG. 3 illustrates physical channels of air interface 127 in an illustrative embodiment. The physical channels in FIG. 3 may represent the channels of a 4G (e.g., LTE) or next-generation network. The physical channels include downlink (DL) physical channels 301 and uplink (UL) physical channels 302. DL physical channels 301 are used for transmissions from a base station to a UE, and UL physical channels 302 are used for transmissions from a UE to a base station. The physical channels are divided into control channels for control plane transmissions, and data channels for user plane transmissions. The downlink control channels include the Physical Control Format Indicator Channel (PCFICH) 302, the Physical Hybrid ARQ Indicator Channel (PHICH) 303, and the Physical Downlink Control Channel (PDCCH) 304. The uplink control channels include the Physical Uplink Control Channel (PUCCH) 305. The downlink data channels include the Physical Downlink Shared Channel (PDSCH) 310, the Physical Broadcast Channel (PBCH) 311, and the Physical Multicast Channel (PMCH) 312. The uplink data channels include the Physical Uplink Shared Channel (PUSCH) 313, and the Physical Random Access Channel (PRACH) 314.

As a general overview of these channels, PCFICH 302 carries a Control Format Indicator (CFI), which indicates the number of OFDM symbols used for transmission of downlink control channel information in a sub-frame. PHICH 303 carries the Hybrid ARQ (HARQ) ACK/NACK information indicating whether a base station has received a transmission on PUSCH 313. PDCCH 304 carries Downlink Control Information (DCI), which includes resource assignments and other control information for a UE or group of UEs. PUCCH 305 carries Uplink Control Information (UCI), such as HARQ ACK/NACK information, Channel Quality Indicators (CQI), scheduling requests, etc. PDSCH 310 is a downlink data-bearing channel for user data. PBCH 311 carries a Master Information Block (MIB) that is broadcast by a base station. PMCH 312 defines the physical layer structure to carry Multimedia Broadcast and Multicast Services (MBMS). PUSCH 313 carries RRC signaling messages, UCI, and user data. PRACH 314 carries random access preambles used for initiation of random access procedures.

As will be described in more detail below, another downlink physical channel 301 may be defined for UE groups, which is indicated as a group common PDCCH (GC-PDCCH) 306. GC-PDCCH 306 may carry DCI, which includes resource assignments and other control information for a group of UEs, slot format information, and/or other control information for a UE group. In one embodiment, GC-PDCCH 306 may be a separate channel defined specifically for UE groups, and reserved in a frame structure of air interface 127. In another embodiment, GC-PDCCH 306 may not be a separate, reserved channel, and may be part of PDCCH 304.

Figure 4:
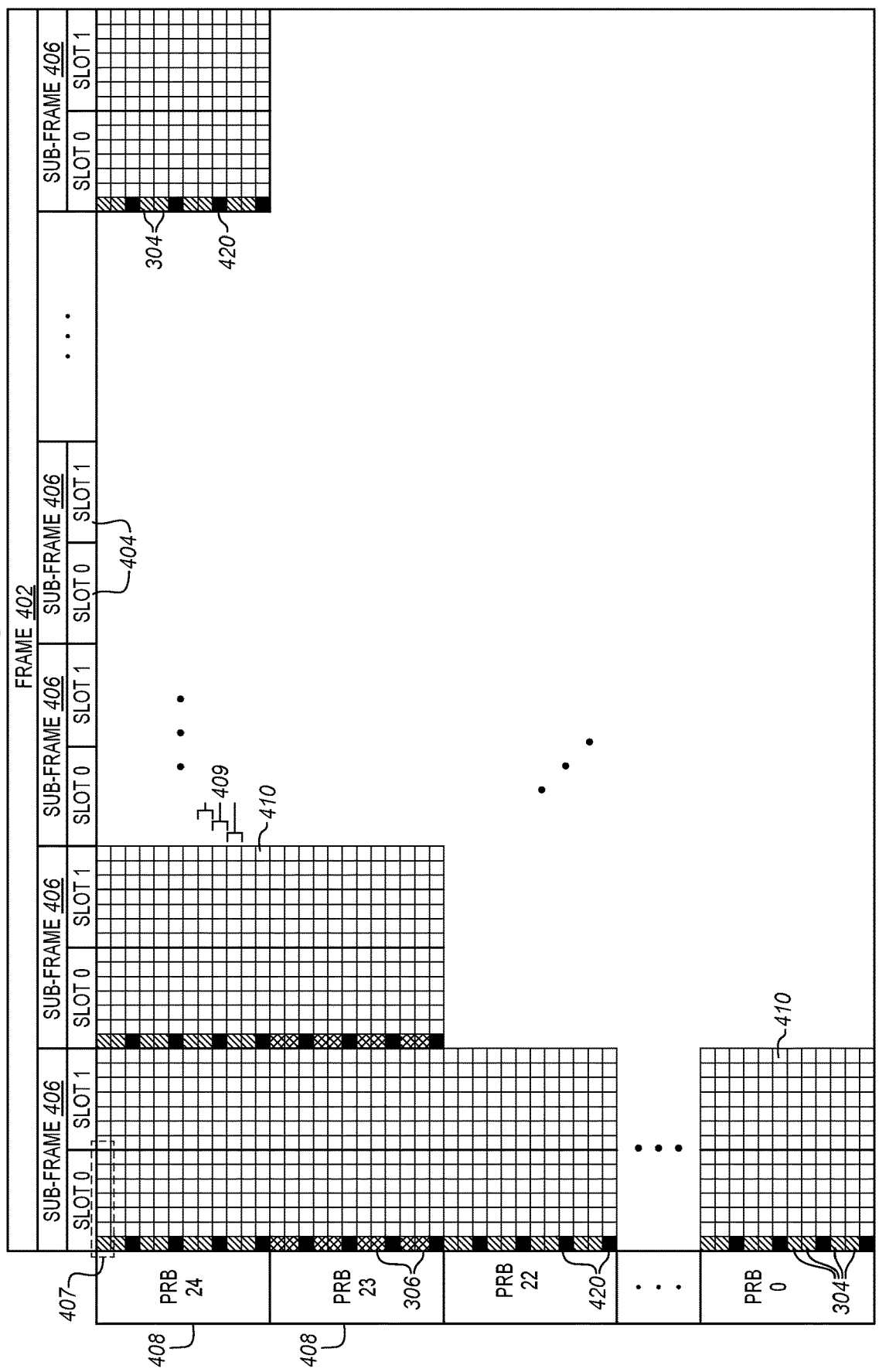
FIG. 4 illustrates a frame structure for an air interface in an illustrative embodiment.

LTE presently uses Orthogonal Frequency Division Multiplexing (OFDM) for the DL physical channels to transmit data in parallel over many closely-spaced sub-carriers using frames, and uses Single Carrier Frequency Division Multiple Access (SC-FDMA) for UL physical channels. Next-generation networks may use similar technologies. FIG. 4 illustrates a frame structure for the air interface 127 in an illustrative embodiment. The frame structure in FIG. 4 illustrates the radio resources of the air interface 127. The example shown in FIG. 4 is for a 5 MHz bandwidth. Frame 402 (also referred to as a radio frame) has an overall length of 10 milliseconds (ms). Frame 402 is divided into twenty individual slots 404 (0.5 ms), and a sub-frame 406 is comprised of two slots 404. Thus, there are ten sub-frames 406 (1 ms) within each frame 402. Each Transmission Time Interval (TTI) consists of two slots 404 or one sub-frame 406 (1 ms). For a normal cyclic prefix, there are seven OFDM symbols 407 per slot 404. OFDM symbols 407 are grouped into Physical Resource Blocks (PRB) 408 that are made up of Resource Elements (RE) 410. REs 410 are the smallest modulation structure, and each RE 410 is one subcarrier (e.g., 15 kHz) 409 by one OFDM symbol 407. Thus, each PRB 408 is comprised of seven OFDM symbols 407 in the time domain, and twelve subcarriers 409 in the frequency domain (for a normal cyclic prefix).

Figure 5:
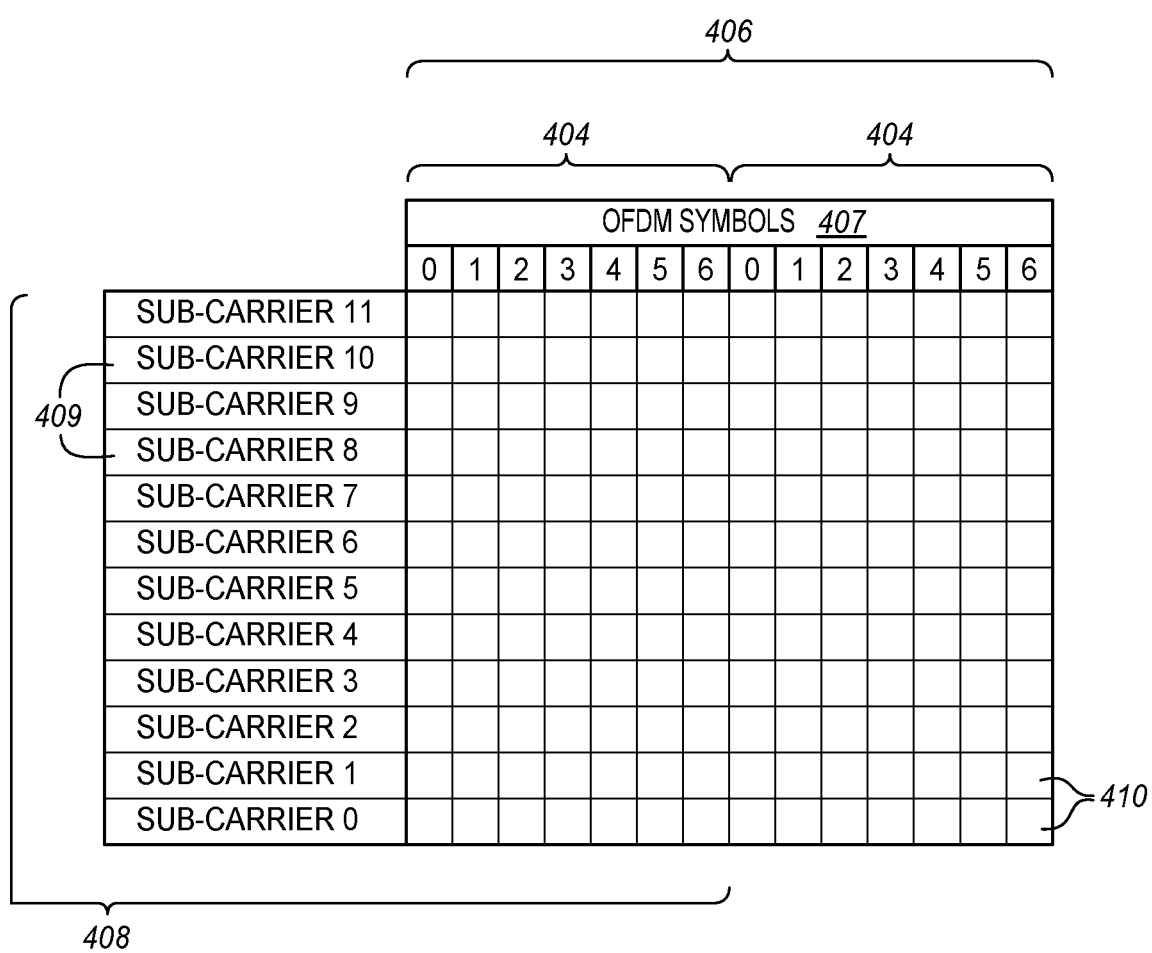
FIG. 5 illustrates a Physical Resource Block (PRB) in a time/frequency grid.

FIG. 5 illustrates a PRB 408 in a time/frequency grid 500. The time domain is shown horizontally, and the frequency domain is shown vertically in the grid 500 of FIG. 5. A PRB 408 includes twelve subcarriers (180 kHz in total) in the frequency domain, and one slot 404 (0.5 ms) of seven OFDM symbols 407 in the time domain. Thus, each PRB 408 comprises eighty-four REs 410 (12×7). A PRB 408 is the smallest unit of radio resources allocated to a UE. The more PRBs 408 allocated to a UE, the higher bit-rate is available to the UE. The number of PRBs 408 that are allocated to a UE at a given point in time depends on scheduling mechanisms in the time and frequency domains.

Figure 6:
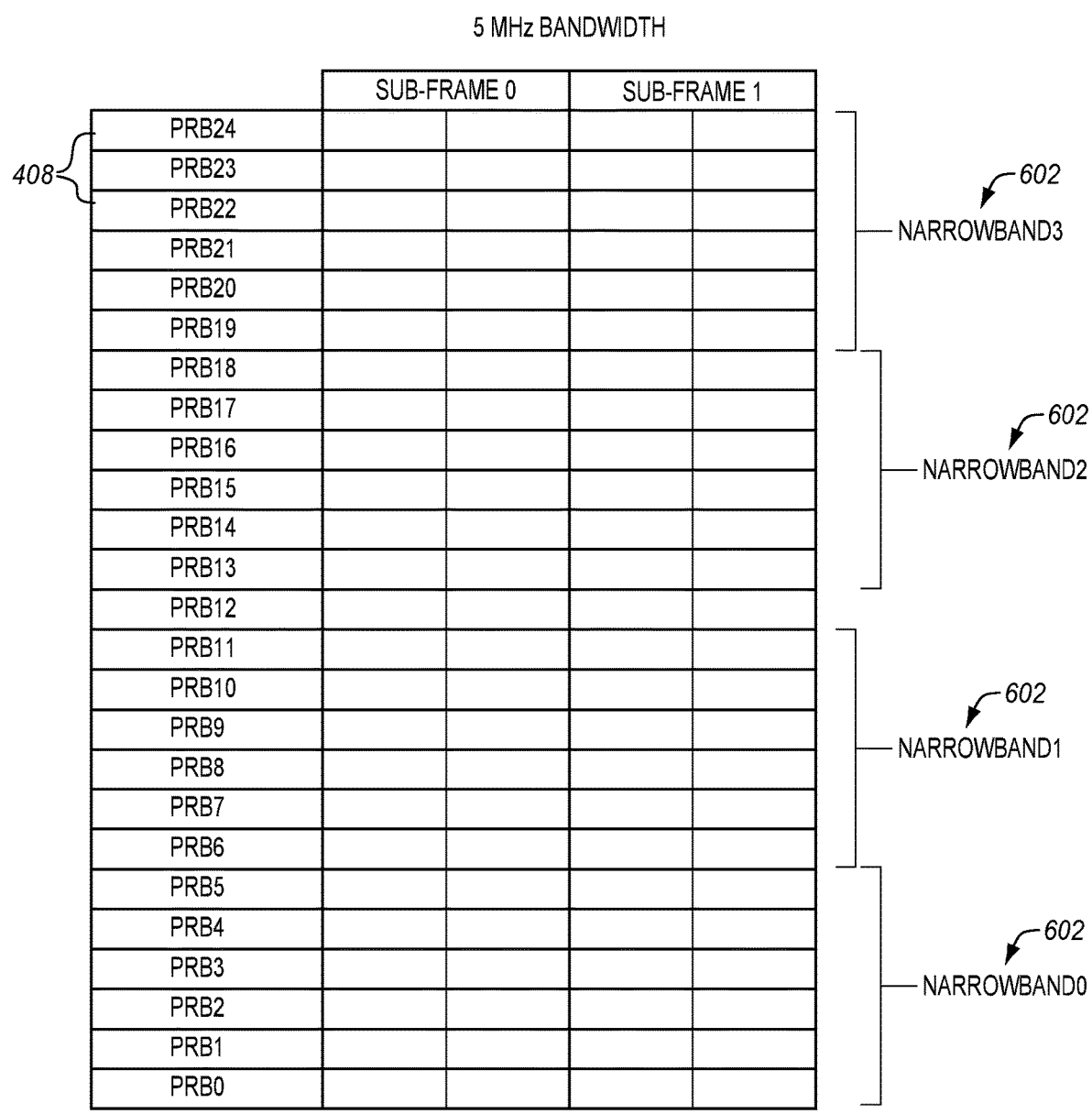
FIG. 6 illustrates a 5 MHz bandwidth in LTE.

FIG. 6 illustrates a 5 MHz bandwidth. A 5 MHz bandwidth is made up of three hundred subcarriers and twenty five PRBs 408. With a total of twenty five PRBs 408, there are four narrowbands 602 (NB) available (the extra PRB is located at the center of the system bandwidth). A narrowband 602 is defined as a set of six contiguous PRBs 408.

In FIG. 4, one or more OFDM symbols of sub-frames 406 may be reserved for PDCCH 304 depending on the CFI. For example, when the CFI is one, the first OFDM symbol 407 of sub-frames 406 are allocated to PDCCH 304. Looking at the left-most OFDM symbol 407 of the first sub-frame 406 (across multiple sub-carriers), REs 410 shown in black are reserved reference signals 420. The REs 410 shown with angled hatching are reserved for PDCCH 304. The other REs 410 of PRBs 408 may be used for other channels, such as PDSCH 310, PUCCH 305, PUSCH 313, etc. The other sub-frames 406 for frame 402 may have a similar format with REs 410 reserved for reference signals 420 and PDCCH 304.

Additionally in this embodiment, one or more OFDM symbols 407 may be reserved or used for GC-PDCCH 306. For example, the first OFDM symbol 407 of sub-frames 406 for a certain set of sub-carriers (e.g., for PRB23) may be reserved for GC-PDCCH 306. RE's 410 shown with cross-hatching are reserved for GC-PDCCH 306. The frame structure in FIG. 4 is an example to show that one or more OFDM symbols 407 may be reserved or used for PDCCH 304, and one or more OFDM symbols 407 may be reserved or used for GC-PDCCH 306. However, PDCCH 304 and GC-PDCCH 306 may be a combined channel where one or more OFDM symbols 407 may be reserved for PDCCH 304/GC-PDCCH 306. Also, the first OFDM symbol 407 of one or more sub-frames 406 may be allocated to GC-PDCCH 306 so that UEs 110 attempt to decode GC-PDCCH 306 before decoding PDCCH candidates.

Control information may be transmitted over a PDCCH 304 in the common search space and/or UE-specific search space. Common control information for all UEs is transmitted through PDCCH 304 in the common search space. UE-specific control information is transmitted through PDCCH 304 in the UE-specific search space. When a UE is in connected mode, a traditional UE was configured to monitor for control signaling over PDCCH 304 every designated slot 404. Control signaling is mapped to one or more CCEs according to a PDCCH format, and the CCEs are mapped to REs 410 in the sub-frame 406. CCEs for multiple UEs or groups of UEs may be transmitted in a single sub-frame 406, so multiple PDCCHs 304 may be transmitted in a single sub-frame 406. A set of consecutive CCEs is referred to as PDCCH candidates, and the UE does not know which of the PDCCH candidates carries control signaling applicable to that UE. Thus, a traditional UE detects the PDCCH candidates in every sub-frame, and attempts to decode the PDCCH candidates using an RNTI. This process is referred to as blind decoding.

Unfortunately, blind decoding in both the common search space and the UE-specific search space consumes a significant amount of power in the UE. In next-generation networks, GC-PDCCH 306 may be implemented so that control information is provided to a UE group. A UE may attempt to decode the GC-PDCCH 306, and if successful, the UE can obtain the control information for the UE group from the GC-PDCCH 306 and may skip decoding of the PDCCH 304 for at least the present slot 404. The UE may also decode the PDCCH candidates from this slot to obtain further control information that is specific to that UE. If decoding of the GC-PDCCH 306 is not successful, then the UE may attempt to decode the PDCCH candidates from this slot. Using this approach, the UE can avoid making unnecessary PDCCH decoding attempts, and save on battery consumption.

Further, in next-generation networks, the GC-PDCCH 306 is a channel that carries information for a group of UEs. One piece of information for a group of UEs is used to indicate the slot format for one or more slots that will be processed by the UEs of the UE group. For example, the first OFDM symbol for a sub-frame may be allocated for the GC-PDCCH 306, and the other thirteen OFDM symbols of the sub-frame may be allocated for physical data channels, such as the PDSCH and the PUSCH. In the embodiments described below, base station 123 is able to select one or more UE groups from a plurality of UEs 110 located in cell 125, and select a slot format for each UE group. The slot format may indicate the transmission direction for the remaining thirteen OFDM symbols, such as DL, UL, or other. Base station 123 provides a slot format indicator to the UE group over the GC-PDCCH 306. Based on the slot format indicator, UEs 110 in the UE group are able to determine the appropriate slot format for processing radio resources, such as decoding data from PRBs 408 or encoding data on PRBs 408.

Figure 7:
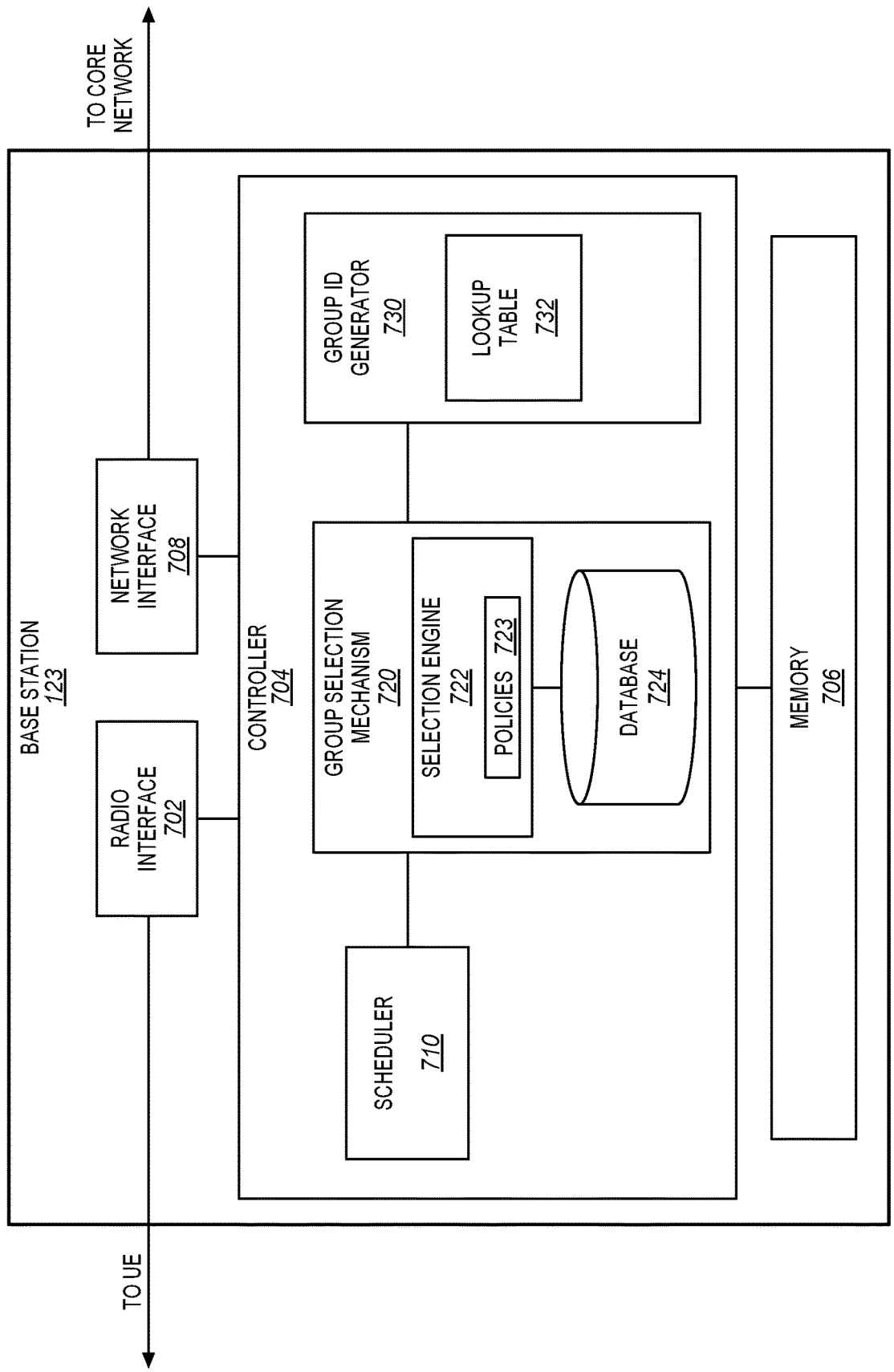
FIG. 7 is a block diagram of a base station in an illustrative embodiment.

FIG. 7 is a block diagram of base station 123 in an illustrative embodiment. Base station 123 is an access network element that communicates with UEs 110 over the air interface 127. Base station 123 includes a radio interface component 702, a controller 704 (including one or more processors), a memory 706, and a network interface component 708. Radio interface component 702 represents the local radio resources of base station 123, such as transceivers and antennas, used for wireless communications to exchange over-the-air signals. Controller 704 represents the internal circuitry, logic, hardware (e.g., a processor), software, etc., that provides the functions of base station 123. Memory 706 is a storage unit for data, instructions, applications, etc., and is accessible by controller 704 or other devices. Network interface component 708 is an interface component that provides an interface or backhaul connection with one or more elements of a core network.

Controller 704 implements a scheduler 710, a group selection mechanism 720, and group ID generator 730. Scheduler 710 comprises a device or set of devices configured to assign radio resources to UEs 110 on the air interface 127. Group selection mechanism 720 comprises a device or set of devices configured to select one or more UE groups from a set of UEs 110 in range of radio interface component 702 to share a GC-PDCCH 306, and select a slot format for each of the UE groups. In this embodiment, group selection mechanism 720 includes a selection engine 722 and a database 724. A network operator defines policies used for selecting UE groups and slot formats for cells of base stations. Selection engine 722 stores the policies 723, and judges the policies 723 based on selection criteria to select the UE groups and slot formats. Database 724 stores information on a plurality of slot formats that may be used on the air interface 127. One assumption is that a multiple access modulation format (e.g., OFDM, NOMA, etc.) is used on the physical layer of the air interface 127 that segments the physical layer into radio resources in the time domain and in the frequency domain. The radio resources may comprise PRBs, which have both a time and a frequency dimension. The radio resources may comprise slots/sub-frames in the time domain, and narrowbands or subcarriers in the frequency domain. The information on the slot formats provides for radio resource allocation for one or more slots in the time domain.

Group ID generator 730 comprises a device or set of devices that generate a group ID for each of the UE groups. Group ID generator 730 may use a lookup table 732 that maps group IDs and slot format indicators to particular slot formats, which is described in more detail below. Although not shown in FIG. 7, the elements of controller 704 may comprise one or more processors, one or more blade servers, one or more Virtual Machines (VM) running on a hardware platform, or other hardware devices.

The components of base station 123 may be implemented on the same hardware platform (including one or more processors). Also, the components of base station 123 and/or the elements of controller 704 may be distributed on different hardware platforms. For example, one or more components of base station 123 may be on different hardware platforms than the transceivers/antennas of base station 123 that form the cell site. Thus, one or more components of base station 123, such as controller 704 and memory 706, may be between the radio components and core network 130, or one or more components of base station 123 may be located in core network 130 itself.

FIG. 8 illustrates information stored by database 724 in an illustrative embodiment. The slot formats are arranged into types, classes, or categories, which are referred to as slot format categories 801-805. A slot format category 801-805 refers to one or more slot formats that share a transmission direction characteristic. For example, slot format categories 801-805 may be classified as follows: DL only, DL centric, UL only, UL centric, DL/UL split, etc. Each slot format category 801-805 is referenced or indexed by a Slot Format Indicator (SFI) 811-815, which may also be referred to as Slot Format related Information. SFI 811-815 is a value or data that indicates a particular slot format category 801-805. One or more slot formats 831-850 are defined for each slot format category 801-805. A slot format 831-850 defines how one or more slots in the time domain are allocated. For instance, a slot format 831-850 may include a symbol pattern 861-880, which is a mapping of symbols (e.g., OFDM symbols) for one or more slots of a frame structure (e.g., Frequency Division Duplex (FDD) or Time Division Duplex (TDD)) in the time domain to a transmission direction. The transmission direction may be DL, UL, or "other", where "other" may be blank (BL), sidelink (SL), reserved, etc. A slot format 831-850 may also include information indicating that the symbol pattern 861-880 applies to single or multiple slots, to aggregated slots, a starting symbol indication for PDSCH 310, beam related group, etc.

FIGS. 9-13 illustrate symbol patterns in an illustrative embodiment. FIG. 9 illustrates an example of a symbol pattern 861 in slot format category 801. Symbol pattern 861 is shown for two slots or one sub-frame, which includes fourteen symbols (symbols 0-6 for slot0 and symbols 0-6 for slot1). It is assumed in this example that slot format category 801 is for a "DL only" type. The first symbol is mapped to GC-PDCCH 306, and the other symbols are mapped to DL. Thus, these symbols are used for a physical DL channel, such as PDSCH 310.

FIG. 10 illustrates an example of a symbol pattern 865 in slot format category 802. It is assumed in this example that slot format category 802 is for a "DL-centric" type. For symbol pattern 865, the first symbol is mapped to GC-PDCCH 306, eleven symbols are mapped to DL, and two symbols are mapped to UL. Thus, the majority of the symbols are mapped to DL, which makes it a DL-centric pattern. The symbols mapped to DL may be used for a physical DL channel, such as PDSCH 310, and the symbols mapped to UL may be used for a physical UL channel, such as PUSCH 313.

FIG. 11 illustrates an example of a symbol pattern 869 in slot format category 803. It is assumed in this example that slot format category 803 is for a "UL-only" type. For symbol pattern 869, the first symbol is mapped to GC-PDCCH 306, and the other symbols are mapped to UL.

FIG. 12 illustrates an example of a symbol pattern 873 in slot format category 804. It is assumed in this example that slot format category 804 is for a "UL-centric" type. For symbol pattern 873, the first symbol is mapped to GC-PDCCH 306, two symbols are mapped to DL, and eleven symbols are mapped to UL. Thus, the majority of the symbols are mapped to UL, which makes it a UL-centric pattern.

FIG. 13 illustrates an example of a symbol pattern 877 in slot format category 805. It is assumed in this example that slot format category 805 is for a "DL/UL split" type. For symbol pattern 877, the first symbol is mapped to GC-PDCCH 306, six symbols are mapped to DL, and seven symbols are mapped to UL. Thus, about half of the symbols are divided between DL and UL, which makes it a DL/UL split pattern.

The symbol patterns illustrated in FIGS. 9-13 are provided merely for example, and network operators may define different symbols patterns as desired. A network operator may define a variety of slot formats 831-850 for each of the slot format categories 801-805. Also, the symbol patterns may be for one slot, two slots as in FIGS. 9-13, or more slots.

Figure 14:
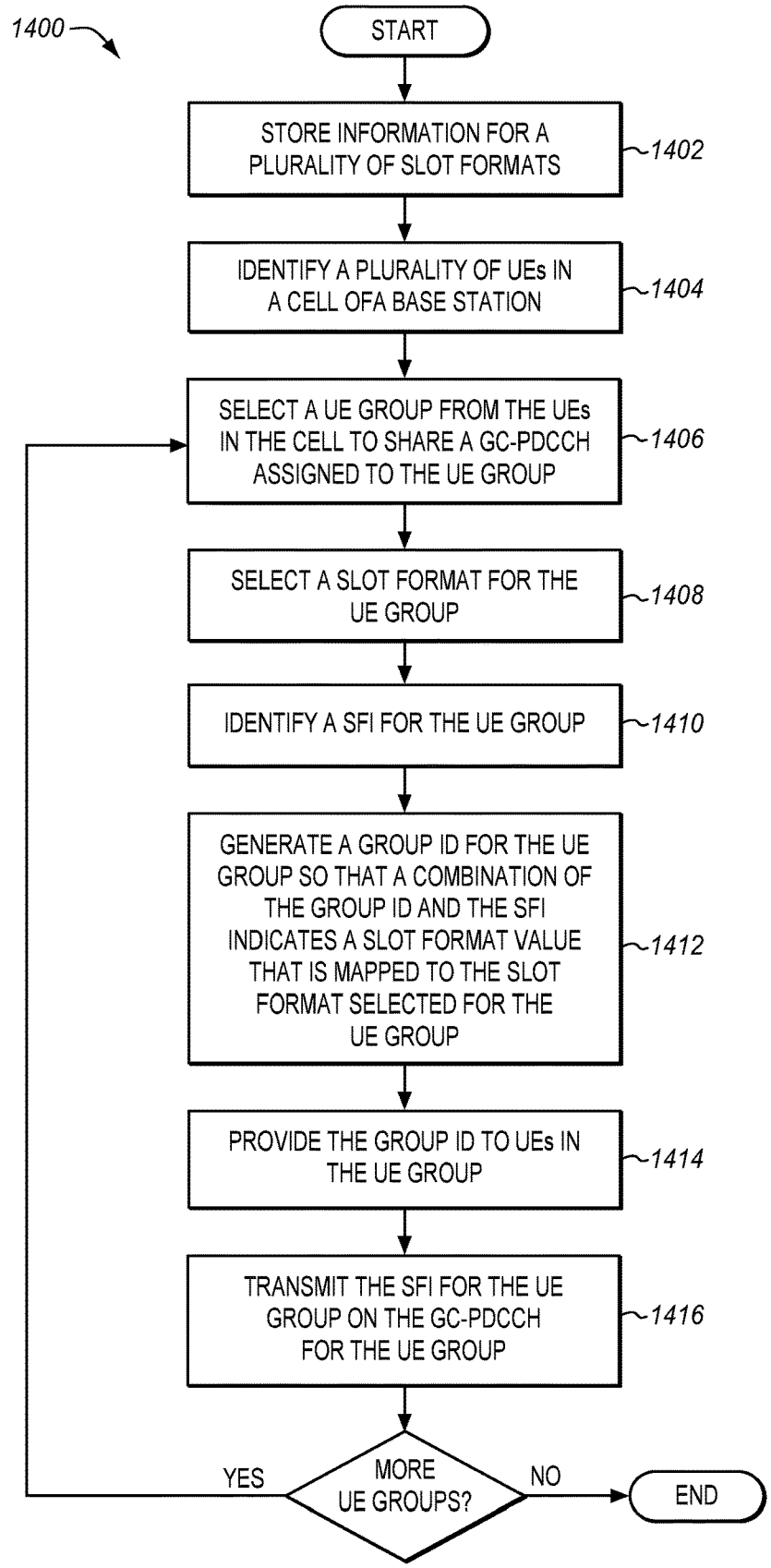
FIG. 14 is a flow chart illustrating a method of selecting UE groups in a cell of a base station, and selecting slot formats for the UE groups in an illustrative embodiment.

FIG. 14 is a flow chart illustrating a method 1400 of selecting UE groups in a cell of a base station, and selecting slot formats for the UE groups in an illustrative embodiment. The steps of method 1400 will be described with reference to base station 123 in FIG. 7, but those skilled in the art will appreciate that method 1400 may be performed in other devices. Also, the steps of the flow charts described herein are not all inclusive and may include other steps not shown, and the steps may be performed in an alternative order.

As described above, database 724 of group selection mechanism 720 stores information for a plurality of slot formats 831-850 that define allocation of radio resources on the air interface 127, where the slot formats 831-850 are classified into slot format categories 801-805 (step 1402). Selection engine 722 of group selection mechanism 720 identifies a plurality of UEs 110 in cell 125 of base station 123 (step 1404). In FIG. 1, for example, there is a plurality of UEs 110 within the cell 125 of base station 123. It is assumed that each of the UEs 110 is in range of radio interface component 702 of base station 123, so that base station 123 is a candidate cell for UEs 110. Based on policies 723, selection engine 722 processes selection criteria to select a UE group from the UEs 110 in cell 125 to share a GC-PDCCH 306 assigned to the UE group (step 1406). A UE group is a subset of UEs in a cell that share a common attribute. Because the UEs in a UE group share a common attribute, selection engine 722 organizes these UEs together to share a GC-PDCCH 306, and provides control information to the UE group over the GC-PDCCH 306. Selection engine 722 may also assign a GC-PDCCH 306 to the UE group that may be decoded exclusively by UEs 110 in the UE group. For example, selection engine 722 may define a group common RNTI for the GC-PDCCH 306 of the UE group, and provide the group common RNTI to the UEs 110 in the UE group (e.g., through RRC signaling). The UEs 110 in the UE group can therefore decode the GC-PDCCH 306 assigned to the UE group using this group common RNTI.

Selection engine 722 also processes the selection criteria to select a slot format for the UE group (step 1408). The slot format selected in step 1408 is one of the slot formats 831-850 stored in database 724. Selection engine 722 may select a UE group and/or slot format per frame or for multiple frames.

A network operator may define various selection criteria to select the UE group and the slot format for the UE group. The following lists examples of selection criteria:

(1) Service/feature requested by UEs. There is consensus of three principal service scenarios for next-generation networks, which are eMBB (enhanced Mobile Broadband), mMTC (massive Machine Type Communications), and URLLC (Ultra-Reliable and Low Latency Communications). There are also existing 3G/4G service/feature scenarios, and may be more future service/feature scenarios. Selection engine 722 may select a different UE group and slot format for UEs that request these services/features.

(2) UE categories and capacities. UE categories or UE classes are used to ensure that a base station can communicate correctly with a UE. By relaying the UE category information to the base station, the base station is able to determine the performance of the UE and communicate with it accordingly. In LTE, for example, there are multiple UE categories defined, such as CAT1-CAT8, LTE Cat-M1 (eMTC), Cat-NB1 (NB-IoT), etc. Selection engine 722 may select a different UE group and slot format for UEs that fall into different UE categories.

(3) Radio access technology. Examples of radio access technologies include OFDMA, SC-FDMA, NOMA, etc. Selection engine 722 may select a different UE group and slot format for UEs that use different radio access technologies.

(4) Beam splitting. With Multimode Multiple Input Multiple Output (mMIMO), it is possible that "cell splitting" under one nominal cell can be conducted through provisioning different control beams. Thus, isolation among control beams may be desirable. To close the link budget shortfall, beamforming at higher frequencies may be used even for control channels. GC-PDCCH 306 may be designed to be reachable to UEs 110 at least in a control beam.

(5) Signal strength of UEs.

(6) UE battery power level.

(7) Tracking areas. Selection engine 722 may divide UEs 110 into UE groups in a cell based on a tracking area indicator.

There may be other selection criteria defined (e.g., spatial cell split, frequency/numerology resource split, coverage split, etc.), and the selection criteria may change dynamically.

With a UE group and slot format selected for a UE group, selection engine 722 identifies a SFI for the UE group (step 1410). The SFI is mapped to a slot format category 801-805 for the slot format selected for the UE group. For example, if selection engine 722 selects slot format 831 from database 724, then selection engine 722 would identify SFI 811 for the UE group that is mapped to slot format category 801. Network operators may want the flexibility to define many different slot formats for radio resource allocation on the air interface 127. However, the SFI may be limited in size to reduce signaling overhead. For example, the SFI may be expressed in three bits of data, which can only denote eight different slot formats. That is why the SFI as indicated in FIG. 8 is used to reference a category of slot format, which is a generalized slot format instead of a symbol-by-symbol mapping. If many more slot formats are defined, then the size of the SFI would need to be increased which also increases signaling overhead.

To address this issue, group ID generator 730 generates a group ID for the UE group so that a combination of the group ID and the SFI indicates a slot format value that is mapped to the slot format selected for the UE group (step 1412). Thus, the combination of the group ID and the SFI indicates a slot format value that denotes a particular slot format for the UE group. In one embodiment, the slot format value may be a concatenation of the group ID and the SFI, so group ID generator 730 may identify the slot format value that is mapped to the selected slot format, identify the SFI selected for the UE group, and extract the group ID from the slot format value. However, a variety of algorithms may be used to determine the group ID. Group ID generator 730 may also define a validity timer (e.g., a single slot or multiple slots) for the group ID.

Figure 15:
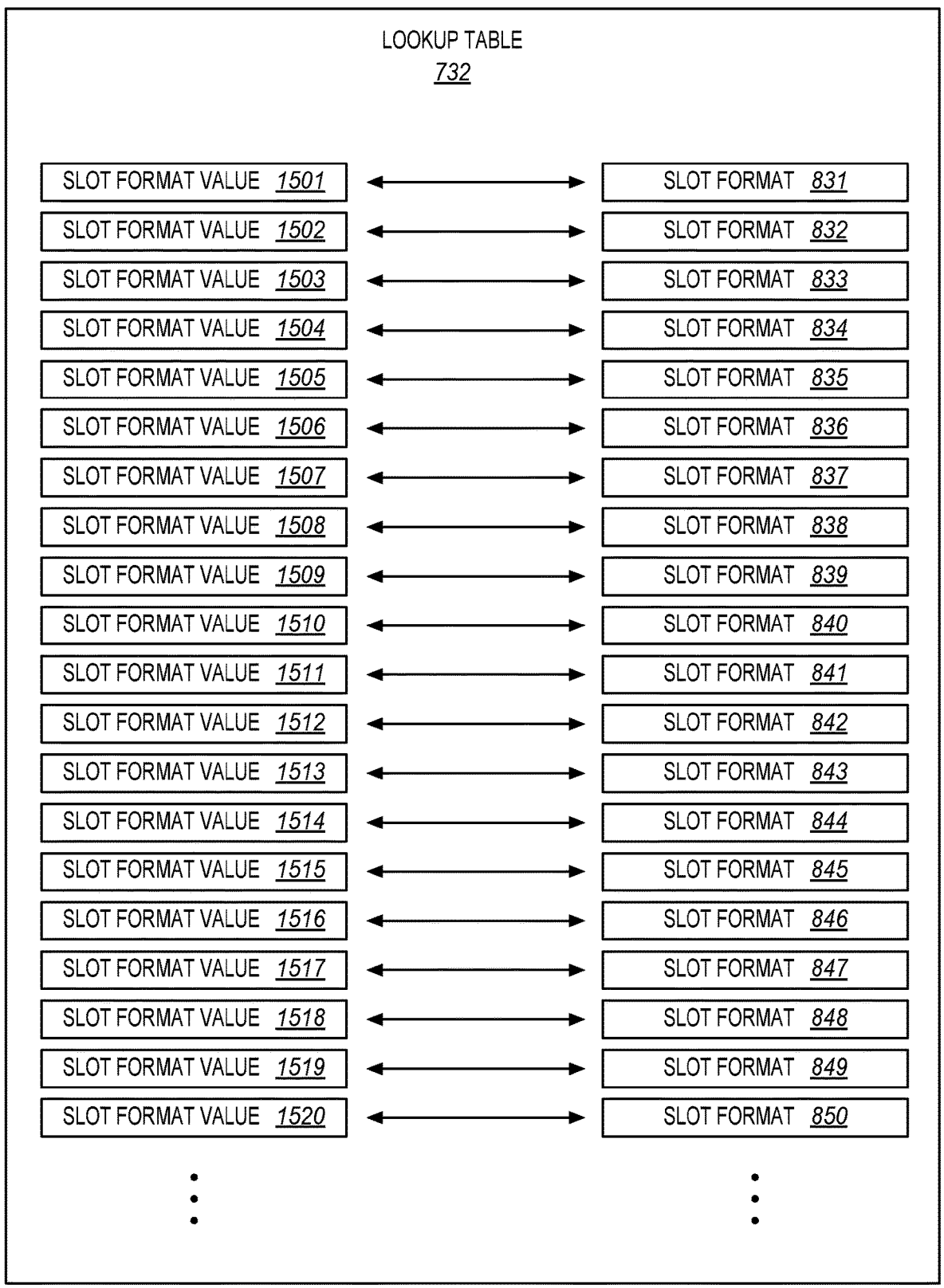
FIG. 15 illustrates a lookup table in an illustrative embodiment.

In generating the group ID, group ID generator 730 may refer to a data structure, such as lookup table 732. FIG. 15 illustrates lookup table 732 in an illustrative embodiment. Lookup table 732 is a data structure that maps slot format values 1501-1520 to slot formats 831-850. For example, slot format value 1501 is mapped to slot format 831, slot format value 1502 is mapped to slot format 832, and so on. A network operator may provision base station 123 with lookup table 732 on a periodic basis. Slot format values 1501-1520 have a larger number of bits than the SFIs provisioned in database 724. In these embodiments, it is assumed that the SFIs 811-815 are constrained to a limited number of bits, such as two or three. Thus, the SFIs 811-815 are mapped to more generalized slot format categories 801-805 as opposed to a specific slot format 831-850. Slot format values 1501-1520 are larger than the constrained number of bits for the SFIs 811-815, and are mapped to specific slot formats 831-850. Thus, by using a combination of the group ID and the SFI to form a slot format value 1501-1520, a much larger number of slot formats 831-850 can be implemented for the air interface 127.

Group ID generator 730 provides the group ID to UEs 110 in the UE group using radio interface component 702 (step 1414). Group ID generator 730 may use higher layers to provide the group ID to UEs 110 in the UE group. For example, group ID generator 730 may use RRC signaling, such as on the PBCH 311, to inform UEs 110 of the UE group of the group ID. Group ID generator 730 may also provide the group common RNTI for the UE group to UEs 110, such as through RRC signaling.

Scheduler 710 transmits the SFI for the UE group over the GC-PDCCH 306 assigned to the UE group using radio interface component 702 (step 1416). UEs 110 in the UE group are configured (e.g., by RRC signaling) to monitor for the SFI on the GC-PDCCH 306 for the UE group. The RRC configuration should indicate the physical resources where the GC-PDCCH 306 for the UE group is transmitted (e.g., PDCCH-to-CCE, CCE-to-RG for group common PDCCH, etc.). Based on the SFI and group ID, a UE 110 is able to derive which radio resources (e.g., OFDM symbols) are allocated to DL, UL, or other. UEs 110 in the UE group can also derive a mask for PDCCH CRC checking so blind detection efforts is only slightly increased if a UE 110 needs to decode the PDCCH 304.

Steps 1406-1416 may be repeated to select multiple UE groups from the UEs 110 within cell 125. In FIG. 1 for example, selection engine 722 may select three distinct UE groups based on the selection criteria, such as UE group 141, UE group 142, and UE group 143. UEs 110 in each UE group 141-143 share a common attribute based on the selection criteria. Selection engine 722 also selects a slot format for each UE group 141-143. For example, selection engine 722 may select slot format 831 for UE group 141, slot format 835 for UE group 142, and slot format 839 for UE group 143. Selection engine 722 also identifies an SFI for each UE group 141-143. Group ID generator 730 generates a unique group ID for each UE group 141-143 so that a combination of the group ID and the SFI indicate a slot format value that is mapped to the slot format selected for each UE group 141-143.

Base station 123 may inform the UEs 110 in a UE group through RRC signaling whether or not to decode the GC-PDCCH 306 assigned to the UE group. UEs 110 in the UE group monitor for the SFI on the GC-PDCCH 306 assigned to the UE group. There may be situations where a UE 110 elects not to use the slot format indicated by the SFI for the UE group. A UE 110 which elects not to use the slot format indicated for a UE group may counter-offer in a RACH procedure or other methods to negotiate with base station 123 either to be removed from the UE group or be assigned to a new UE group (possibly a new SFI).

Figure 16:
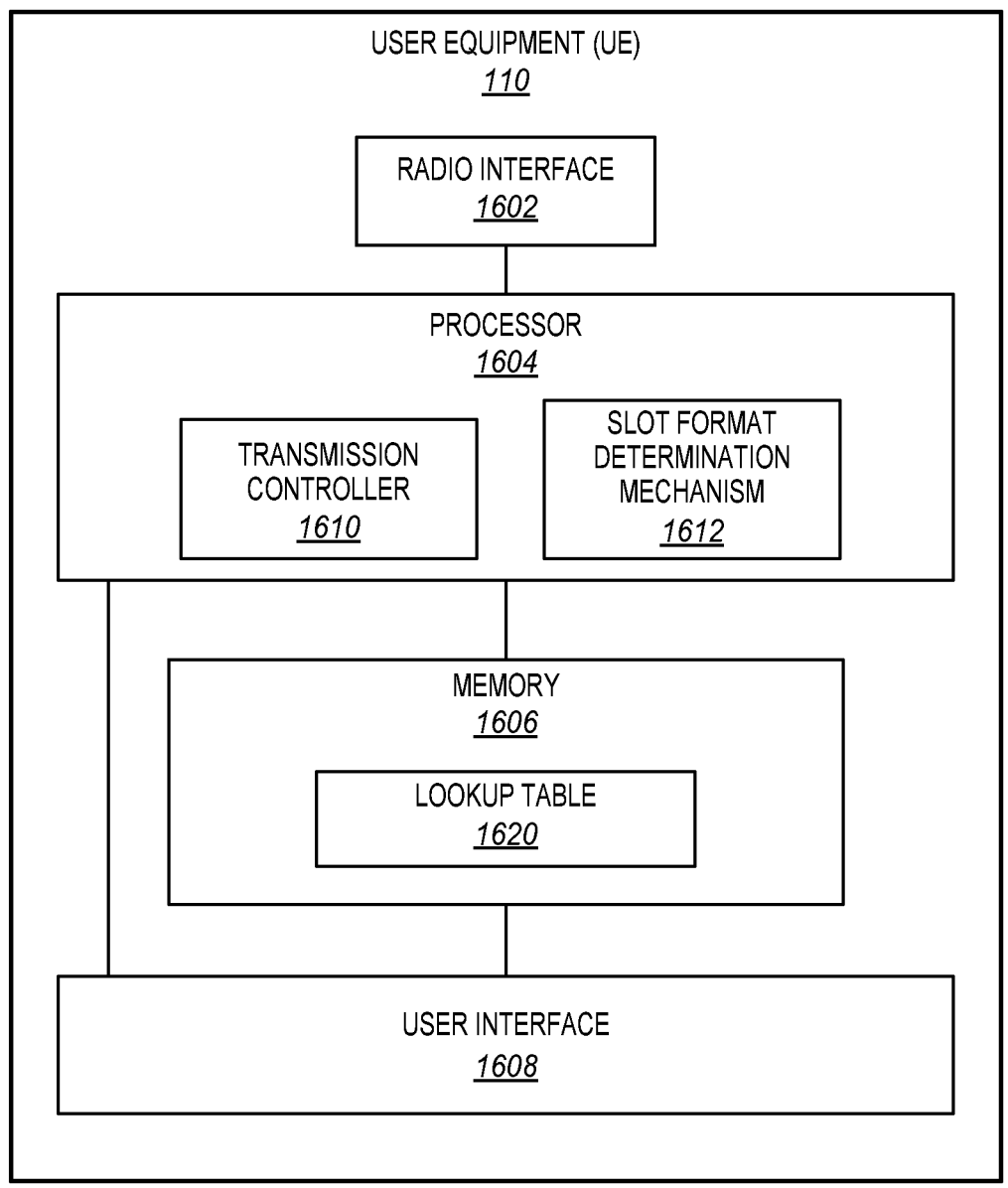
FIG. 16 is a block diagram of User Equipment (UE) in an illustrative embodiment.

FIG. 16 is a block diagram of UE 110 in an illustrative embodiment. UE 110 includes a radio interface component 1602, one or more processors 1604, a memory 1606, and a user interface component 1608. Radio interface component 1602 is a hardware component that represents the local radio resources of UE 110, such as transceivers and antennas, used for wireless communications with a base station (e.g., base station 123) via radio or "over-the-air" signals. Processor 1604 represents the internal circuitry, logic, hardware, software, etc., that provides the functions of UE 110. Memory 1606 is a computer readable storage medium for data, instructions, applications, etc., and is accessible by processor 1604. User interface component 1608 is a hardware component for interacting with an end user. For example, user interface component 1608 may include a screen or touch screen (e.g., a Liquid Crystal Display (LCD), a Light Emitting Diode (LED) display, etc.), a keyboard or keypad, a tracking device (e.g., a trackball or trackpad), a speaker, and a microphone. UE 110 may include various other components not specifically illustrated in FIG. 16.

Processor 1604 implements a transmission controller 1610 and a slot format determination mechanism 1612. Transmission controller 1610 is configured to decode data from channels on the air interface 127, and to encode data onto channels of the air interface 127. Slot format determination mechanism 1612 is configured to determine a slot format for a UE group for UE 110. Memory 1606 stores a lookup table 1620, which may correspond with lookup table 732 as shown in FIG. 15.

Figure 17:
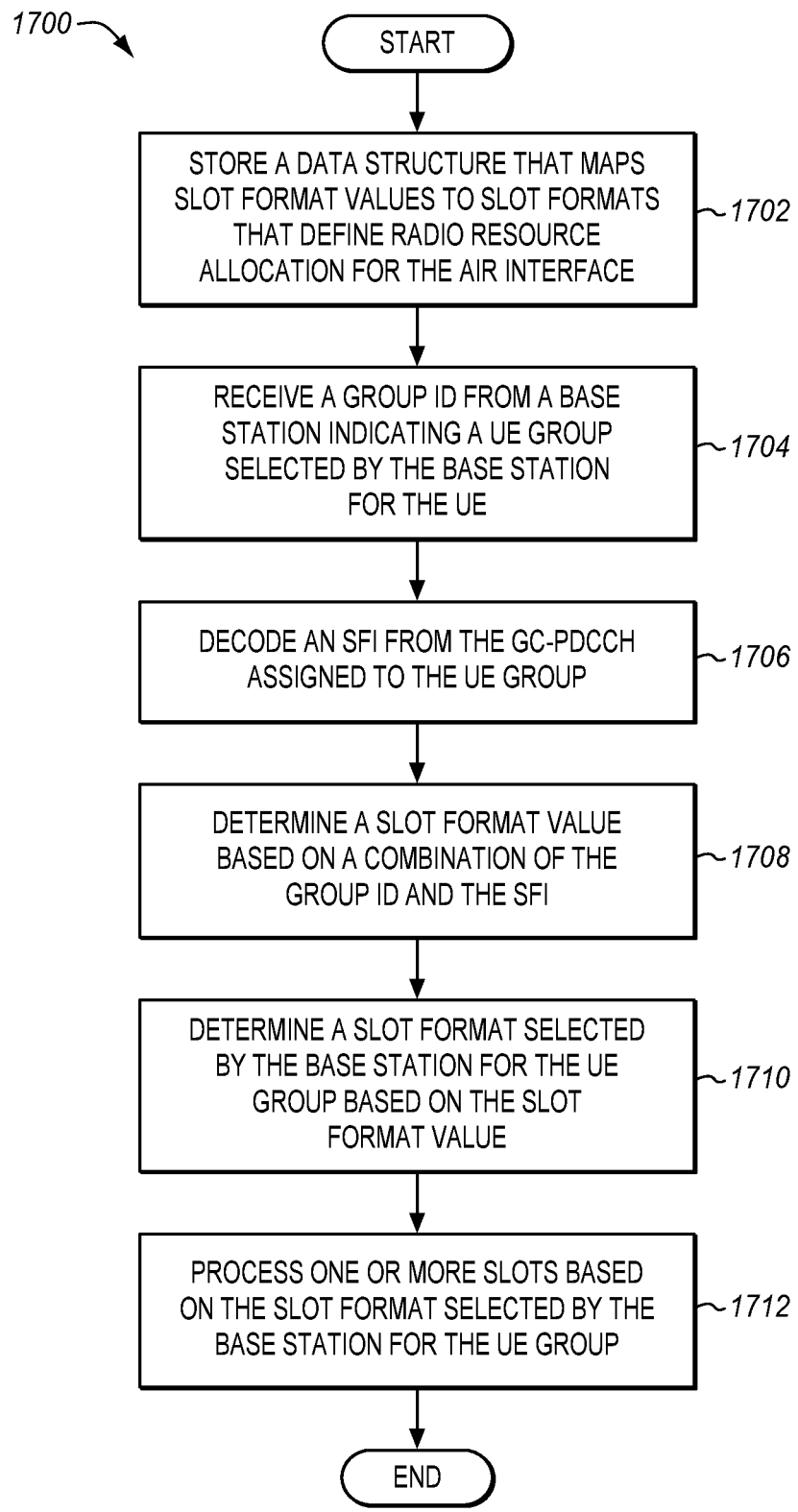
FIG. 17 is a flow chart illustrating a method performed in User Equipment (UE) to determine a slot format in an illustrative embodiment.

In the embodiments described herein, UE 110 is enhanced to decode a GC-PDCCH 306 for a UE group and determine a slot format selected for the UE group based on an SFI and group ID provided by base station 123. Further details of the enhancements are described in FIG. 17. FIG. 17 is a flow chart illustrating a method 1700 performed in UE 110 to determine a slot format in an illustrative embodiment. The steps of method 1700 will be described with reference to UE 110 in FIG. 16, but those skilled in the art will appreciate that method 1700 may be performed in other devices.

As described above, memory 1606 stores a data structure (e.g., lookup table 1620) that maps slot format values to slot formats that define allocation of radio resources on the air interface 127 (step 1702). Transmission controller 1610 receives a group ID from base station 123 indicating a UE group selected by base station 123 for UE 110 (step 1704). For example, transmission controller 1610 may receive the group ID from base station 123 via RRC signaling over PDBH 311. Transmission controller 1610 may also receive a group common RNTI for the UE group from base station 123 in the RRC signaling. Transmission controller 1610 may negotiate with base station 123 whether or not to be included in the particular UE group.

Transmission controller 1610 decodes an SFI from the GC-PDCCH 306 assigned to the UE group (step 1706). To decode the SFI, transmission controller 1610 may attempt to decode the GC-PDCCH 306 assigned to the UE group based on the group common RNTI for the UE group. If decoding is successful, then transmission controller 1610 extracts the SFI sent by base station 123 on the GC-PDCCH 306. The SFI is mapped to a slot format category for the slot format selected by base station 123 for the UE group. Slot format determination mechanism 1612 determines a slot format value based on a combination of the group ID and the SFI (step 1708). As described above, the combination of the group ID and the SFI indicates a slot format value that is mapped to a particular slot format. Slot format determination mechanism 1612 may concatenate the group ID and the slot format indicator to determine the slot format value, or use another algorithm to determine the slot format value from the group ID and the slot format indicator. Slot format determination mechanism 1612 then determines a slot format selected by base station 123 for the UE group based on the slot format value (step 1710). For example, slot format determination mechanism 1612 may access lookup table 1620, and use the slot format value as an index to identify the slot format for the UE group. Transmission controller 1610 then processes one or more slots of the radio resources based on the slot format selected by base station 123 for the UE group (step 1712). For example, transmission controller 1610 may decode data from one or more slots of PRBs allocated to UE 110 based on the slot format. Transmission controller 1610 may additionally or alternatively encode data on one or more slots of PRBs allocated to UE 110 based on the slot format.

Because UE 110 is able to decipher a slot format value based on the group ID and the SFI, the SFI sent to UE 110 over the GC-PDCCH 306 can be constrained to two or three bits. Yet, the slot format value can be mapped to literally hundreds or thousands of different slot formats so that network operators have flexibility in how radio resources are used.

In one example, assume that the SFI is constrained to three bits and SFI 811 is selected for a UE group having a value of "001" (see FIG. 8). Thus, slot format category 801 has been selected for the UE group. Also assume that slot format value 1501 in FIG. 15 is "1000001", which is mapped to slot format 831 shown in FIG. 9. Group ID generator 730 in base station 123 may select a group ID of "1000" so that the combination (1000, 001) equals "1000001". When UE 110 receives a group ID of "1000" and an SFI of "001", it is able to determine a slot format value of "1000001". This slot format value points to slot format 831 (and symbol pattern 861) as shown in FIG. 9 for a DL-only category.

Figure 18:
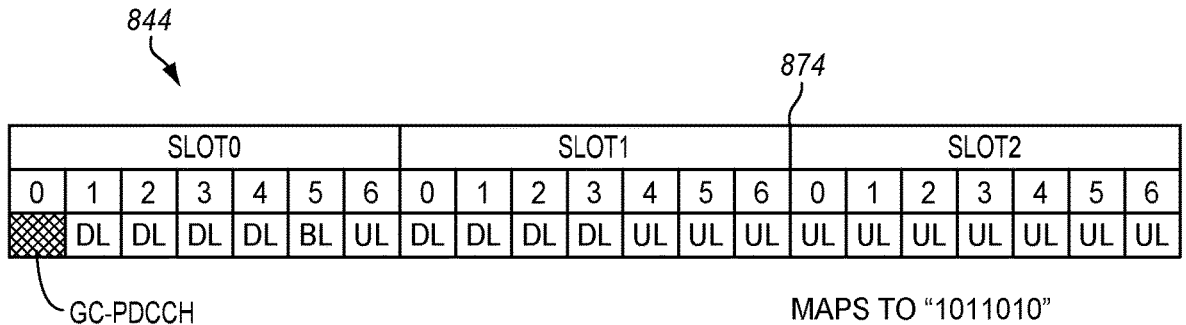
FIGS. 18-20 illustrate symbol patterns for slot formats in an illustrative embodiment.
Figure 19:
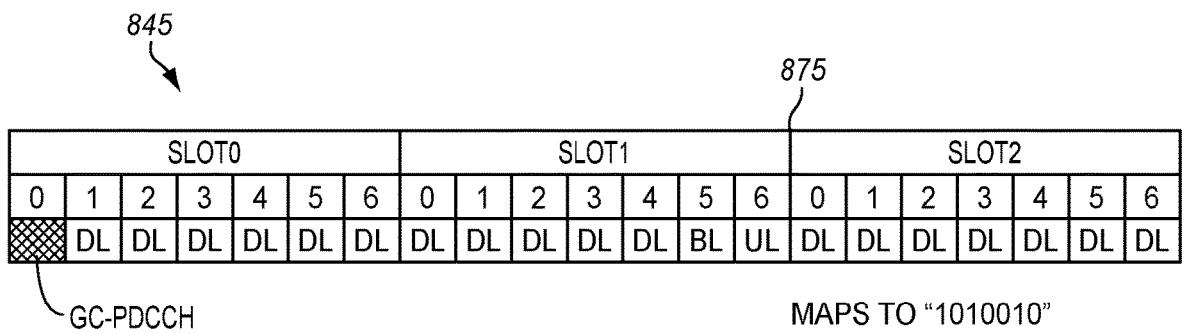
Figure 20:
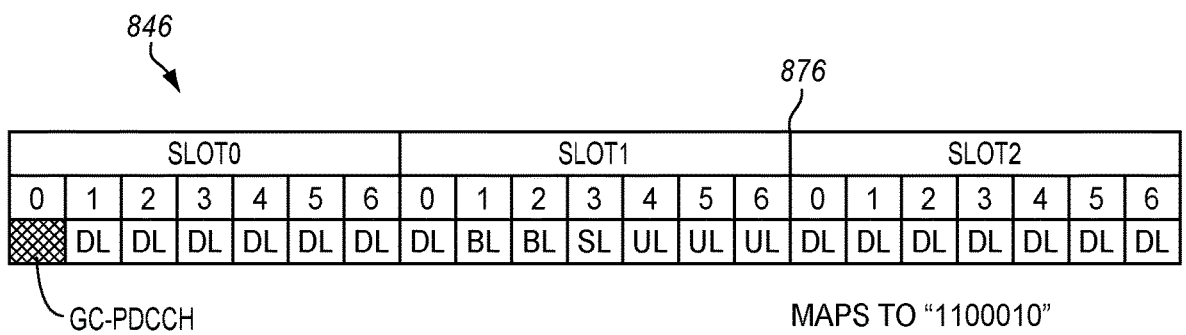

FIGS. 18-20 illustrate symbol patterns for slot formats in an illustrative embodiment. FIG. 18 illustrates an example symbol pattern 874 for slot format 844, FIG. 19 illustrates an example symbol pattern 875 for slot format 845, and FIG. 20 illustrates an example symbol pattern 876 for slot format 846. Slot format 844 is mapped to a slot format value of "1011010", slot format 845 is mapped to a slot format value of "1010010", and slot format 846 is mapped to a slot format value of "1100010". In this example, assume that the SFI is again constrained to three bits with a value of "010". Group ID generator 730 in base station 123 may select a group ID of "1011" so that the combination (1011, 010) equals "1011010" and points to slot format 844. Group ID generator 730 in base station 123 may select a group ID of "1010" so that the combination (1010, 010) equals "1010010" and points to slot format 845. Group ID generator 730 in base station 123 may select a group ID of "1100" so that the combination (1100, 010) equals "1100010" and points to slot format 846. Each of these slot formats indicates a symbol pattern for three continuous slots, and each slot format is individually addressable using a combination of the group ID and the SFI.

The slot formats may also indicate that symbol patterns are aggregated. The aggregation level information may be delivered by higher layer signaling semi-statically. However, due to the possibility of dynamic change of transmission direction, the slot aggregation information may also be signalled dynamically. For example, it may be desirable to change three aggregated DL slots to two DL slots and one UL slot to quickly adapt to traffic load variation. Since the aggregation information is closely related to usage/transmission direction of a slot, it may be jointly encoded with slot format information for optimized encoding. Separate encoding of slot aggregation level gives cleaner design with less optimization.

Figure 21:
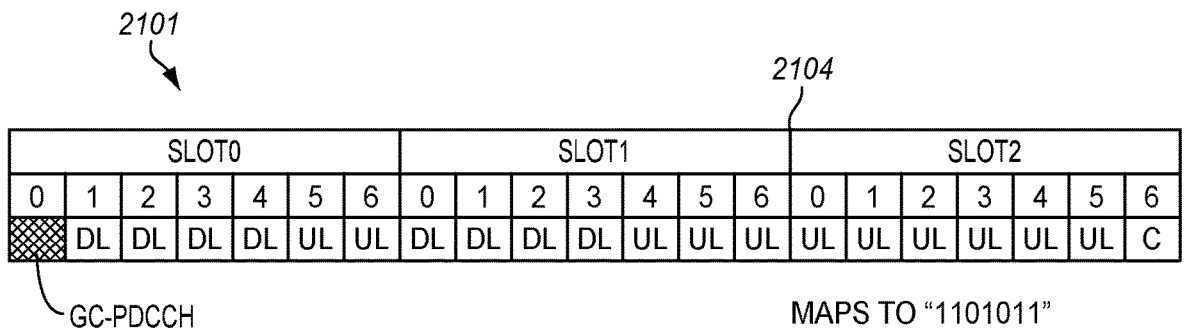
FIGS. 21-22 illustrate symbol patterns with and without slot aggregation in an illustrative embodiment.
Figure 22:
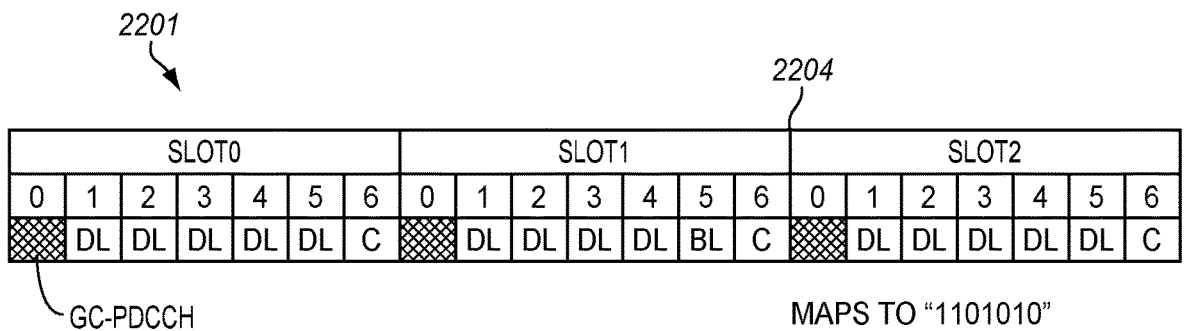

The group ID may be designed to carry slot aggregation information even when constrained to a limited number of bits. There may be different slot aggregations depending on the existence of control regions in the middle of aggregated slots. If the slots are aggregated but DL and UL control regions are still present every slot, the GC-PDCCH 306 may be transmitted every slot to deliver SFI for that slot. FIGS. 21-22 illustrate symbol patterns with and without slot aggregation in an illustrative embodiment. FIG. 21 illustrates an example symbol pattern 2104 for slot format 2101 with aggregation of slots, and FIG. 22 illustrates an example symbol pattern 2204 for slot format 2201 without aggregation of slots. As in FIG. 21, when slots are aggregated with GC-PDCCH 306 at the beginning of the aggregated slots and with a UL control region ("C") at the end of the aggregated slots, GC-PDCCH 306 with SFI is transmitted only at the beginning of the aggregated slots. As in FIG. 22, when slots are not aggregated, GC-PDCCH 306 is at the beginning of each of the slots, and a UL control region ("C") may be at the end of each slot. In this example, assume that the SFI is again constrained to three bits with a value of "011" for aggregated slots. Group ID generator 730 in base station 123 may select a group ID of "1101" so that the combination (1011, 011) equals "1011011" and points to slot format 2101 to indicate aggregation. The SFI may have a value of "010" for non-aggregated slots. Group ID generator 730 in base station 123 may select a group ID of "1101" so that the combination (1011, 010) equals "1011010" and points to slot format 2201 to indicate no aggregation. The aggregation level (i.e., number of slots) may therefore be "embedded" in the combination of the group ID and SFI.

The GC-PDCCH 306 may be used to indicate the starting position and duration of DL/UL data in a slot. It could be beneficial to use the GC-PDCCH 306 to indicate the starting position of DL/UL data since the scheduling DCI and the scheduled DL data are in different slots. For example, when the scheduling DCI is in slot n while the scheduled data is in slot n+k, the starting position of DL/UL data in slot n+k can be indicated by the GC-PDCCH 306 in slot n+k. Alternatively, it should also be possible to determine the DL/UL data starting position by higher-layer signaling, in which case the UE is not required to acquire the information from the GC-PDCCH 306.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor (i.e., a computer-readable medium). Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

What is claimed is:

1. A base station comprising:
   a radio interface component configured to communicate with a plurality of User Equipment (UE) within a cell over an air interface;
   a database configured to store information for a plurality of slot formats that define allocation of radio resources on the air interface, wherein the slot formats are classified into slot format categories;
   a selection engine configured to identify the UEs in the cell, to process selection criteria to select a UE group from the UEs in the cell to share a physical downlink control channel assigned to the UE group, to process the selection criteria to select one of the slot formats for the UE group, and to identify a slot format indicator for the UE group that is mapped to one of the slot format categories for the one of the slot formats;
   a group ID generator configured to generate a group identifier (ID) for the UE group so that a combination of the group ID and the slot format indicator indicates a slot format value that is mapped to the one of the slot formats selected for the UE group, and to provide the group ID to the UEs in the UE group via the radio interface component; and
   a scheduler configured to transmit the slot format indicator on the physical downlink control channel to the UEs in the UE group via the radio interface component.

2. The base station of claim 1 wherein:
   the group ID generator is configured to transmit the group ID to the UEs in the UE group through Radio Resource Control (RRC) signaling.

3. The base station of claim 1 wherein:
   the group ID generator is configured to define a validity timer for the group ID.

4. The base station of claim 1 wherein:
   the slot formats each define a symbol pattern that maps symbols for at least one slot of a frame in the time domain to a transmission direction; and
   the transmission direction includes downlink, uplink, blank, sidelink, and reserved.

5. The base station of claim 1 wherein:
   the selection criteria include services requested by the UEs in the cell; and
   the services comprise one of enhanced Mobile Broadband (eMBB), massive Machine Type Communications (mMTC), and Ultra-Reliable and Low Latency Communications (URLLC).

6. The base station of claim 1 wherein:
   the selection criteria include UE categories for the UEs in the cell.

7. The base station of claim 1 wherein:
   the selection criteria include tracking areas for the UEs in the cell.

8. A method of operating a base station that communicates with a plurality of User Equipment (UE) within a cell over an air interface, the method comprising:
   storing information for a plurality of slot formats that define allocation of radio resources on the air interface, wherein the slot formats are classified into slot format categories;
   identifying the UEs in the cell;
   processing selection criteria to select a UE group from the UEs in the cell to share a physical downlink control channel assigned to the UE group;
   processing the selection criteria to select one of the slot formats for the UE group;
   identifying a slot format indicator for the UE group that is mapped to one of the slot format categories for the one of the slot formats;
   generating a group identifier (ID) for the UE group so that a combination of the group ID and the slot format indicator indicates a slot format value that is mapped to the one of the slot formats selected for the UE group;
   providing the group ID from the base station to the UEs in the UE group; and
   transmitting, at the base station, the slot format indicator on the physical downlink control channel to the UEs in the UE group.

9. The method of claim 8, wherein providing the group ID from the base station to the UEs in the UE group comprises:
   transmitting the group ID to the UEs in the UE group through Radio Resource Control (RRC) signaling.

10. User Equipment (UE) comprising:
    a radio interface component configured to communicate with a base station over an air interface;
    a memory configured to store a data structure that maps slot format values to slot formats that define allocation of radio resources on the air interface; and
    a processor configured to implement a transmission controller configured to receive a group identifier (ID) from the base station indicating a UE group selected by the base station for the UE, and to decode a slot format indicator from a physical downlink control channel assigned to the UE group, wherein
    the processor is further configured to implement a slot format determination mechanism configured to determine a slot format value based on a combination of the group ID and the slot format indicator, and to determine one of the slot formats selected by the base station for the UE group based on the slot format value, and wherein
    the transmission controller is further configured to process at least one slot of the radio resources based on the one of the slot formats selected by the base station for the UE group.

11. The UE of claim 10 wherein:
the transmission controller is configured to process Radio Resource Control (RRC) signaling to receive the group ID.

12. The UE of claim 10 wherein:
the slot format determination mechanism is configured to concatenate the group ID and the slot format indicator to determine the slot format value.

13. The UE of claim 10, wherein:
the slot formats each define a symbol pattern that maps symbols for the at least one slot of a frame in the time domain to a transmission direction; and
the transmission direction includes downlink, uplink, blank, sidelink, and reserved.

14. A method operable in User Equipment (UE) that communicates with a base station over an air interface, the method comprising:
storing a data structure that maps slot format values to slot formats that define allocation of radio resources on the air interface;
receiving a group identifier (ID) from the base station indicating a UE group selected by the base station for the UE;
decoding a slot format indicator from a physical downlink control channel assigned to the UE group;
determining a slot format value based on a combination of the group ID and the slot format indicator;
determining one of the slot formats selected by the base station for the UE group based on the slot format value; and
processing at least one slot of the radio resources based on the one of the slot formats selected by the base station for the UE group.

15. The method of claim 14 wherein receiving the group ID from the base station comprises:
processing radio resource control signaling to receive the group ID.

16. A computer program embodied on a non-transitory computer-readable medium, said computer program comprising encoded instructions which, when run in hardware, control the hardware to perform the method of claim 8.

17. A computer program embodied on a non-transitory computer-readable medium, said computer program comprising encoded instructions which, when run in hardware, control the hardware to perform the method of claim 14.

* * * * *